Jan. 29, 1946.  W. G. WHITE  2,393,670
AUTOMATIC SELF COMPENSATING MAGNETIC COMPASS SYSTEM
Original Filed Sept. 29, 1942  2 Sheets-Sheet 1
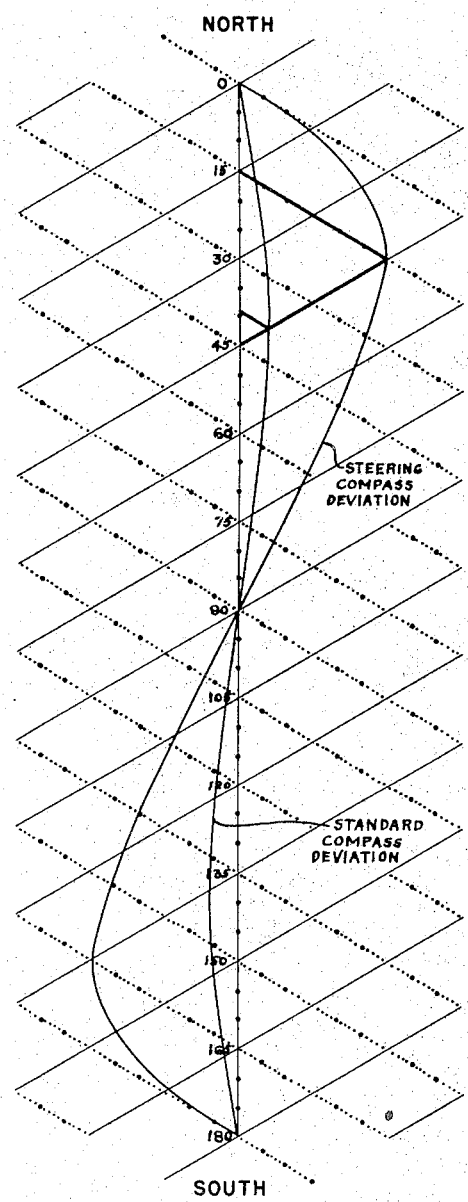
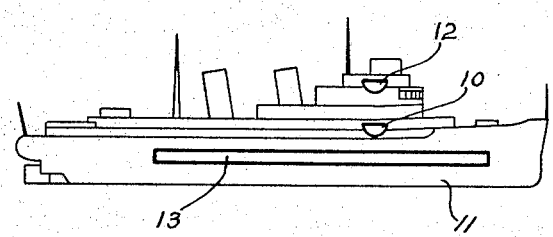
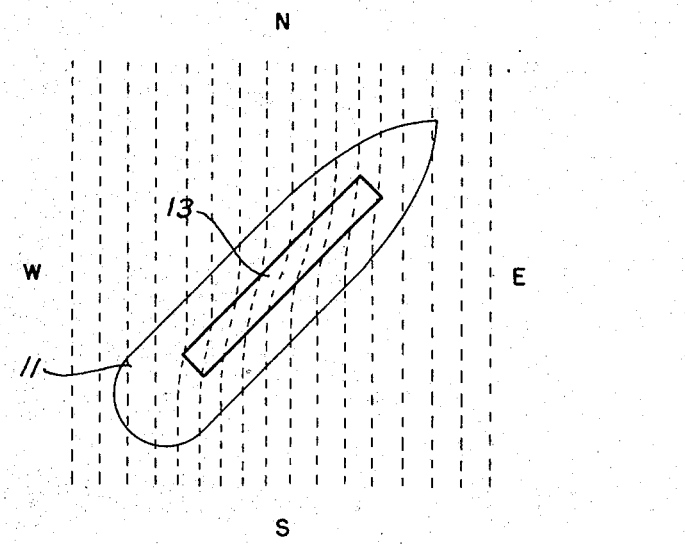
Wilfrid G. White.
INVENTOR
BY
ATTORNEY Jan. 29, 1946.    W. G. WHITE    2,393,670
AUTOMATIC SELF COMPENSATING MAGNETIC COMPASS SYSTEM
Original Filed Sept. 29, 1942    2 Sheets-Sheet 2

Wilfrid G. White.
INVENTOR

BY
ATTORNEY

Patented Jan. 29, 1946

2,393,670

UNITED STATES PATENT OFFICE 2,393,670

AUTOMATIC SELF-COMPENSATING MAGNETIC COMPASS SYSTEM

Wilfrid Gordon White, United States Navy

Continuation of application Serial No. 460,113, September 29, 1942. This application March 18, 1943, Serial No. 479,590

10 Claims. (Cl. 33—225)

(Granted under the act of March 3, 1883, as amended April 30, 1928; 370 O. G. 757)

This invention relates to compensating systems, and particularly to a compensating system for vehicle course determining devices, especially magnetic compasses and is a continuation of my application, Serial No. 460,113 filed September 29, 1942.

It is a primary object of this invention to provide a repeater system which will indicate correct magnetic directions, or more specifically, a repeater system which will automatically compensate for the magnetic compass deviations which are caused by the metallic parts of the vehicle upon which the compass is mounted and other localized metal, particularly ferric metal which may comprise the vehicle's cargo.

Other objects and advantages of this invention will appear more fully hereinafter from the following description taken together with the accompanying drawings which illustrate two embodiments of the invention. It is to be expressly understood however, that the drawings are for the purpose of illustration only and not for the purpose of limitation, reference being had for this latter purpose to the appended claims.

In the drawings:

Fig. 1 illustrates in elevation a vessel upon which are shown, in exaggerated size, two magnetic compasses mounted in position relative to the horizontal iron comprising the vessel's cargo;

Fig. 2 illustrates diagrammatically the deviation produced by the horizontal iron;

Fig. 3 is a Napiers diagram of the deviations of the compasses shown in Fig. 1;

Figure 4:
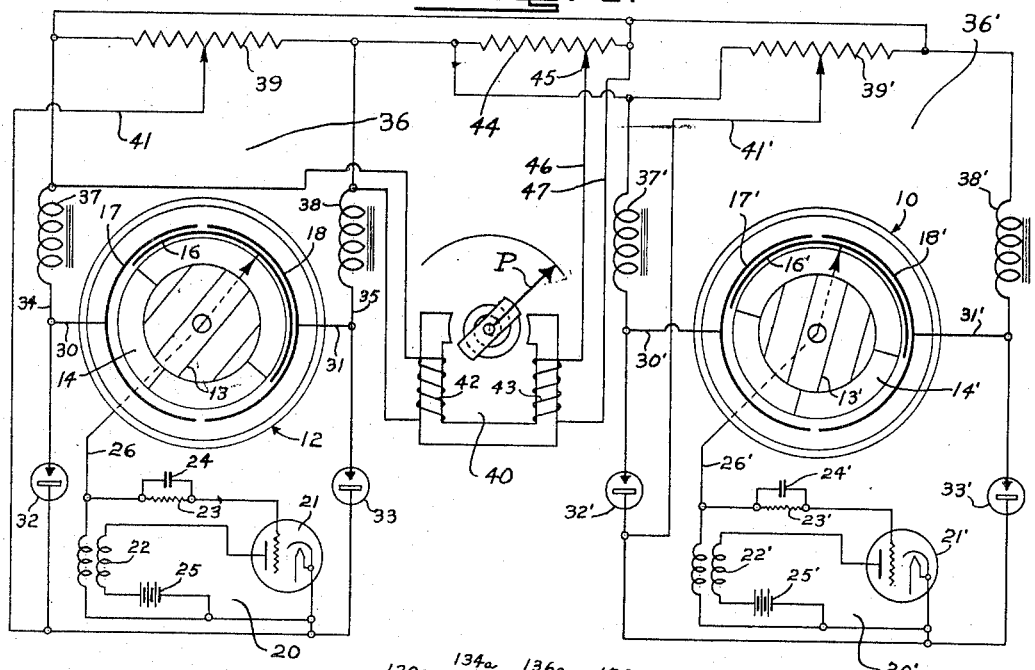
Fig. 4 is a diagrammatic view showing one arrangement of apparatus illustrative of one embodiment of this invention.

This invention is predicated upon the discovery by the applicant that two magnetic compasses may be positioned relative to each other and to the localized ferric-metal so that the deviations produced in each by the said localized metal will be of the same sense but of a different order. The deviation of the compass which is positioned at the greater distance from the disturbing influence of the localized ferric metal will be less than the deviation of the compass which is positioned nearer the said metal. The deviation of the compass located at the greater distance will be equal to a determinable factor or ratio multiplied by the difference in the deviation of both compasses, or the difference in the vehicle's headings as indicated by each compass. When the compasses are positioned so as to comply with the conditions stipulated, it is a relatively simple matter to find the compass deviation on all headings and in any latitude.

For purposes of illustrating this invention, there is shown in Fig. 1 a steering and standard compass 10 and 12, respectively, each mounted on a wooden ship 11 which has no magnetic qualities. It is assumed for purposes of illustration, that the deviation in each of the symmetrically positioned compasses 10 and 12 is caused solely by the local horizontal iron 13 which is assumed to comprise the vessel's cargo. This horizontal iron 13 as shown in Fig. 2 is symmetrically placed relative to the fore and aft axes of the vessel and to the center of the compass since it is the usual practice to position the compass so that substantially all of the horizontal iron is symmetrically placed relative thereto. This symmetrically placed horizontal iron causes a deviation which is classified according to Navy standard usage as "quadrantal" deviation since it changes in sign in each successive quadrant as the ship's head swings in azimuth and has its maximum and minimum value in each quadrant.

The horizontal iron 13 causes the lines of force of the earth's field, in taking the path of lowest reluctance, to crowd through the iron so as to follow the direction of its length. When the ship is heading north magnetic, these lines of force follow the direction of the length of iron which also has its axis on the magnetic meridian. The compass shows no deviation for the heading of magnetic north. When the ship's head is northeast, magnetic, as illustrated in Fig. 2, the lines of force of the earth's field are drawn out of their usual direction toward the direction of the length of iron or along its axis. The compass will thus have an easterly deviation which is maximum on this heading.

Fig. 2, which shows the ship 11 on a northeasterly heading, also shows the lines of force of the earth's magnetic field crowded into the horizontal iron 13 thus illustrating the distortion of the earth's field which produces the maximum easterly deviation. In Fig. 3 there is shown a plot of the deviation of both the standard and steering compasses on a Napier's diagram. This diagram is useful primarily in applying correctly the errors produced by the local iron, but is set forth here merely as a convenient means of illustrating the deviation of both compasses on all ships' headings from 0° north magnetic, easterly to 180° south magnetic. The other half of the diagram for headings varying from 180° westerly to 360° is not shown since it would be but a duplication under the assumed conditions of the two quadrants shown in Fig. 3. It is important to note from the diagram that differences in the ship's headings as indicated on the diagram can be used to determine the deviation of the standard compass. For example, assume that the uncorrected steering compass indicated a ship's heading of 15° east. The compass deviation on this heading as obtained from the diagram in Fig. 3 is 30° east, and the magnetic heading corresponding to the indicated heading would be 45° east. In order to ascertain from the diagram the heading of the ship as indicated by the standard compass for a magnetic heading of 45° east, departure along the solid line shows a deviation of 6° east. The heading per standard compass would (following the dotted line) be 39° east. The difference in the heading of the ship as indicated by the two compasses is 24° east and the fixed ratio or factor for the assumed condition is one-fourth; consequently, one-fourth of the difference in indicated headings will for all headings equal the deviation of the standard compass.

Since it is apparent from the foregoing and particularly from an inspection of Fig. 3 that the deviation of the standard compass will always be one-fourth of the difference in the heading indicated by both the standard and steering compass, it remains but to provide a system, and preferably an electrical repeating system, which will automatically apply a correction to the instrument repeating the ship's heading as indicated by the standard compass. The applied correction is obtained in this embodiment of the invention by taking one-fourth of the difference in the electrical output of each electrical transmitter associated with the standard and steering compasses and applying this electrical quantity to the repeating instrument associated with the said standard compass.

The repeating system of the prior art, especially those operating upon the principle of the Wheatstone bridge, have been selected to exemplify this invention. As a specific embodiment thereof, the repeating systems illustrated and described in the United States patent to F. West, Jr., No. 2,111,442, issued on March 15, 1938, has been selected. This particular telemetering system is not adapted to repeat compass directions throughout 360° and is selected merely because it affords a convenient and simplified means of illustrating this invention.

In Fig. 4 there is shown both the standard and steering compasses 10 and 12 as having an arcuate condenser plate 16 and 16' each conveniently secured to the pivoted compass card 14 and 14'. These compass cards are actuated by the magnetic elements represented for this purpose at 13 and 13'. As illustrated, the standard compass indicates a ship's head of 39° east; whereas the steering compass indicates a ship's head of 15° east. The plate 16 movable with the magnetic element of the standard compass is connected by means of the conductor 26 to one output terminal of a source of high frequency alternating current of a substantially constant amplitude. For this purpose there is illustrated an L. C. oscillator circuit 20 which includes the usual triode tube 21, inductively coupled coils 22, grid leak 23, by-pass condenser 24 and a source of plate current 25. It may be desirable to provide an amplifier for raising the amplitude output of the oscillator to a predetermined maximum level in which event those amplifiers having substantially undistorted amplitude output should be used or a constant amplitude control circuit for the amplified output of the oscillator should be provided.

A pair of condenser plates 17 and 18 are positioned about the periphery of the compass card 14 so as to be variable capacitively coupled with the plate 16 as the plates 17 and 18 move about the plate 16 which changes in the ship's heading. Each plate 17 and 18 is connected through the conductors 30 and 31, respectively, and the diode tubes 32 and 33 to a return line leading to the oscillator circuit 20. Thus, a low impedance return path is established for alternate half cycles of the current flowing in the paths established by the coupling between condensers 16—17 and 16—18. The plates 17 and 18 are also connected to the potentiometer 39 through the coils 37 and 38 by means of the conductors 34 and 35 to form two arms of the capacity impedance branch of the Wheatstone bridge 36. The return line 41 leading from the potentiometer to the oscillator divides the potentiometer so that it forms the two remaining arms of the impedance capacitive bridge and provides means for balancing the bridge on 0° headings.

Means is thus provided for rectifying the alternating current in the branch lines 34 and 35 of the bridge network so that the winding 42 of a direct current center zero meter such as that disclosed at 40 may be connected to the output diagonals of the impedance capacitive bridge 36.

The condenser plate 16' of the steering compass 10 is also secured to the compass card 14' so as to be actuated by the magnetic element 13' supported thereon and is connected by means of the conductor 26' to a high frequency alternating supply circuit 20'. The arcuate condenser plates 17' and 18' are each secured to the compass bowl so as to be movable with the ship as it swings in azimuth to vary the coupling between these condenser plates. The plates 17' and 18' are each connected by means of conductors 30' and 31' and diode tubes 32' and 33' respectively to the return line leading to the supply circuit 20' to provide a low impedance path shunting alternate half cycles of the supply source current. The plates 17' and 18' are also connected through the choke coils 37' and 38' to the potentiometer 39' to form two arms of the capacitive impedance branch of the Wheatstone circuit 36'. The potentiometer 39' is connected to the return line of the oscillator 20 by the conductor 41'. The output voltage of the bridge networks 36 and 36' is connected across potentiometer 44 so that the potential drop across the potentiometer 44 will equal the difference between the outputs of the two bridge circuits. It is, therefore, apparent that means is provided for obtaining a direct current voltage which varies linearly with changes in headings as indicated by the separate compasses 10 and 12; and also that means is provided for obtaining a voltage equal to the difference in output voltages which represent the headings of each compass.

The center tap 45 of the potentiometer 44 is set at a position so that the voltage across the leads 46 and 47 is equal to the difference in voltage output of each bridge network multiplied by the predetermined factor, and under the assumed condition is set to a position wherein the voltage across the leads 46 and 47 is equal to one-fourth of the voltage drop in the potentiometer 44. The leads 46 and 47 are connected to the compensating coil 43 of the direct current instrument 40. Thus the indicator P of the instrument 40 will not repeat the position of the compass 12 but will rather indicate the correct magnetic heading of the ship corresponding to the heading indicated by the compass 12.

Figure 5:
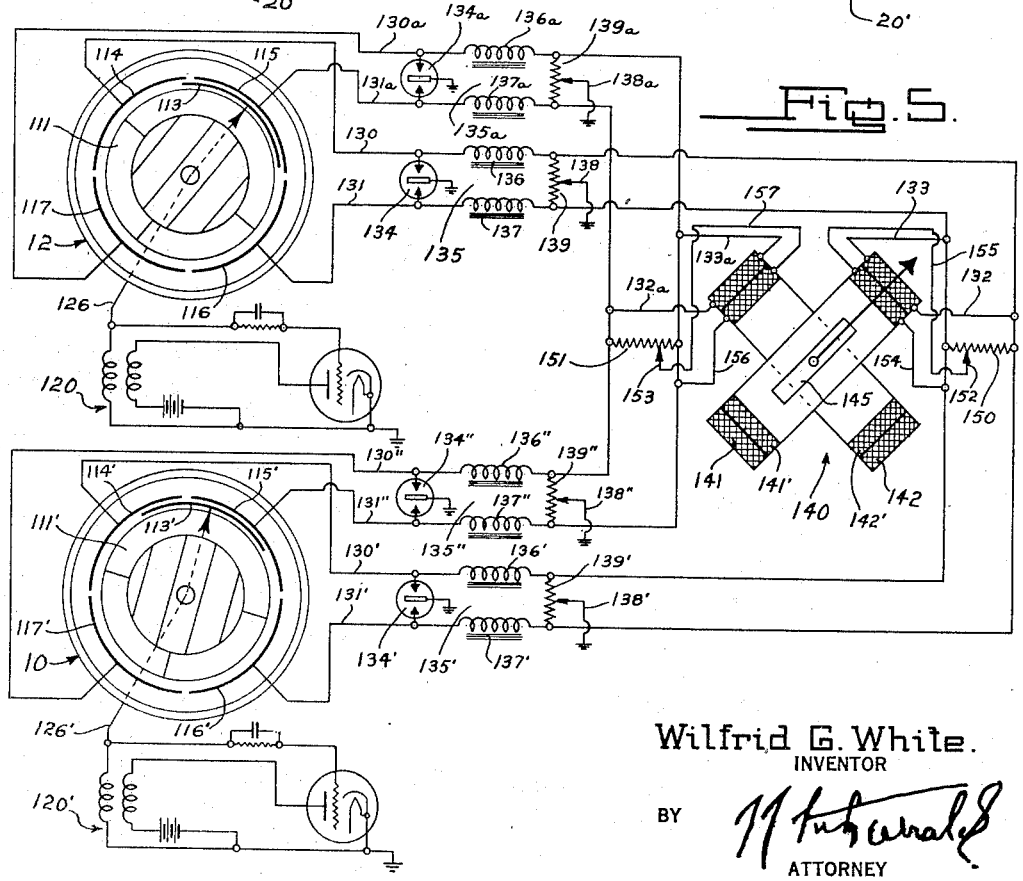
Fig. 5 is a diagrammatic view showing a modification of Fig. 4 adapted to repeat compass directions through 360°.

As a more practical application of the invention, the use of a telemetering system illustrated in the patent to F. West, Jr., No. 2,277,027, is preferred since with the system therein disclosed, the compass direction may be repeated throughout 360°. Fig. 5 illustrates the modification of my invention wherein the standard and steering compasses 12 and 10 each have an arcuate condenser plate 113 and 113' mounted on their respective compass cards 111 and 111' for simultaneous movement therewith. These condenser plates 113 and 113' as illustrated have an arcuate extension of substantially 90° and are each connected by the conductors 126 and 126' to one terminal of a separate high frequency alternating current such as the oscillator circuits 120 and 120'. These plates each form the movable plate of a variable condenser which also includes four separate similarly arcuated condenser plates 114, 115, 116, and 117, each supported within the bowl of the compass 12 closely adjacent the path of movement of the movable plate 113. Likewise, the four plates 114', 115', 116' and 117' are secured to the inside of the bowl of the compass 10 to lie closely adjacent the paths of movement of the movable plate 113'. All of the plates are perfectly concentric with the compass cards so that all points on the condenser plates 113 and 113' are always equal distance from the opposite points on their corresponding stationary plates 114—117 and 114'—117' of the compasses 12 and 10, respectively.

Each diametrically opposed pair of stationary condenser plates, for example, plates 114 and 116, are connected to the potentiometer 139 through the choke coils 136 and 137 by means of the leads 130 and 131. The adjustable element 138 of the potentiometer 139 is connected to form a ground connection with the supply source 120. The rectifier tube 134 is connected to the leads 130 and 131 to provide a low impedance path to ground for alternate half cycles of the alternating current flowing in the leads 130 and 131. The leads 132 and 133 connect the coil 141 of the repeating instrument 140 with the lines leading from the opposite diagonals of the impedance capacitive bridge 135 formed by the condenser plates 113, 114 and 116 and the potentiometer 139. The diametrically opposed plates 115 and 117 are also connected by the leads 130a and 131a through the choke coils 136a and 137a to opposite terminals of a potentiometer 139a which also has its adjustable tap 138a connected to a ground connection with the alternating current supply source to form an impedance capacity bridge 135a. The full wave rectifier tube 134a is connected to provide a low impedance path to ground for alternate half cycles of the alternating current flowing in the leads 130a and 131a. The output of this bridge 135a is connected by means of the leads 132a and 133a to the coil 142 of the repeating instrument 140.

A similar arrangement is provided for each pair of diametrically opposed condenser plates 114' and 116' and 115' and 117' of the compass 10 which are connected through lines 130' and 131' and 130" and 131" and choke coils 136' and 137' and 136" and 137", respectively, to the opposite terminals of the potentiometer 139' and 139".

Each potentiometer has a movable tap connection 138' and 138" to ground. It is thus apparent that diametrically opposite condenser plates each form the arms of one branch of separate impedance capacitive bridge circuits indicated generally at 135' and 135". In order that direct current may be obtained in the coils 141' and 142' to actuate the movable vane 145 of the repeating instrument 140, the double anode tubes 134' and 134" are connected in circuit to provide a low impedance ground connection with the alternating current supply source 120 and 120' for alternate half cycles of the current flowing in lead lines 130'—131' and 130"—131". A direct current potential is thus established in each separate bridge circuit and differences in the relative capacity of the bridge circuit resulting from movement of the condenser plates 114—117 and 114'—117' relative to the condenser plate 113 and 113', respectively, will result in corresponding differences of potential being established across the output terminals of each bridge circuit. The polarity of the voltage across the bridge circuits output terminals is dependent upon the coupling between diametrically opposite condensers and as the movable condenser plate is moved from a position adjacent one stationary plate to a position adjacent a diametrically opposite plate the polarity of the bridge circuit output voltage is changed.

The output voltage of the bridge circuits 135 and 135' are each impressed across a potentiometer 150 so that their voltage opposes each other. The adjustable contact 152 of the potentiometer is set at a position wherein the voltage across the leads 154 and 155 will be equal to the difference in voltage output of the bridge circuit 135 and 135' multiplied by the predetermined ratio. These leads are connected to the compensating coil 141' which is concentric with the coil 141. Likewise, the output voltage of the bridge circuits 135a and 135" are each impressed across the potentiometer 151 so that their voltages oppose each other. The adjustable contact 153 is set at a position wherein the voltage impressed across the leads 156 and 157 will be equal to the difference in output voltage of the bridge circuits 135a and 135" multiplied by the fixed predetermined ratio. These leads are connected to the compensator coil 142' which is concentric with the main coil 142 of the repeating instrument 140.

As illustrated in Fig. 5, the compass bowl is positioned relative to the compass card of the standard compass 12 to indicate a ship's head of 39° east in which position the plates 115 and 114 are moved relative to the plate 113 so that the capacities of the separate bridge circuits will be unequal and both bridges will be unbalanced. The capacitive coupling between plates 113 and 115 being greater than the capacitive coupling between plates 113 and 117, the voltage across the output terminals of the bridge circuit 135a will be greater than that voltage which appears across the output diagonal of the bridge circuit 135. Thus, the voltage applied to the coil 142 will be greater than the voltage applied to the coil 141. The resultant field produced by these two coils will, under the assumed conditions, when energized by the output voltage of their respective bridge circuits, have an axis along the line formed at an angle of 39° relative to the plane of the coil 142. The movable vane 145 would then take a position to indicate the heading of the standard compass 12.

The steering compass 10, as illustrated, indicates a ship's heading of 15° east, and since on this heading the coupling between movable and fixed plates is unequal the bridges 135' and 135" will be unbalanced, the voltage output of the bridge circuit 135" will be greater than the voltage output of the bridge circuit 135'. Furthermore, the voltage appearing across the output diagonals of the bridge circuit 135a is under the assumed conditons greater than the voltage which appears across the bridge circuit 135". Consequently, when one-fourth of the difference between the outputs of these two bridge circuits is applied to the compensating coil 142' of the repeating instrument 140, the flux produced by the current flowing therein will be in the same direction as the flux produced by the current flowing in the main coil 142 which is energized by the voltage output of the bridge circuit 135a. But since the capacitive couplings between the plates 113 and 114 are less than the capacitive couplings between the condensers 113' and 114', the voltage which appears across the bridge diagonals 135 will be less than the voltage appearing across the bridge circuit 135'. Therefore, when one-fourth of the difference between the outputs of the bridge circuits 135 and 135' is applied to the compensating coil 141' of the repeating instrument, the current flowing therein will produce a flux which is equal in magnitude but opposite in direction to the flux produced by the current flowing in the coil 141. Thus, the movable vane 145 will assume a position along the axes of the concentric coils 142 and 142' to indicate a correct magnetic heading of 45° east.

From observation of Fig. 3, it should be noted that in correcting the compass, westerly errors in deviation must be subtracted from the compass reading, whereas easterly errors are added. To obtain the correct magnetic headings for the compass readings it will be apparent that voltages applied to the compensating coils 141' and 142' must always be of a correct polarity. For example, assume that the standard compass 12 indicates a ship's heading of 121° and the steering compass 10 indicates a heading of 145°. Under these conditons the voltage output of the bridge circuit 135 would be greater than the voltage output of the bridge circuit 135'. However, the voltage output of the bridge circuit 135a would under these conditions be less than the voltage output of the bridge circuit 135". Consequently, the voltage applied to the coils 142 and 142' would now produce opposing fluxes which are equal under the particular conditions assumed. The vane 145 will, therefore, take a position along the axes of the coils 141 and 141' to indicate a correct magnetic heading of 315°.

It should be understood that the conditions under which the factor of one-fourth is obtained are merely illustrative and may not occur in actual practice. The particular ratio used is dependent upon the location of the compasses relative to each other and to localized ferric metals. Furthermore, a single source of high frequency alternating voltage may be utilized for energizing each repeating system rather than resorting to separate sources as illustrated. It should also be understood that the entire disclosure is set forth merely for illustration and not for the purposes of limitation, reference for this latter purpose being had to the subjoined claims.

This invention may be manufactured and used by or for the Government of the United States of America for governmental purposes without the payment of any royalties thereon or therefor.

I claim:

1. In a self compensating system for indicating correct magnetic directions, the combination including two magnetic compasses spaced relative to each other so that the deviation in each compass for any given heading will be of the same sense but of a different order, first means responsive to the directional indications of said first compass for producing a first quantity variable in magnitude as a function of the indicated direction of said first compass, second means responsive to the directional indications of said second compass for producing a second quantity variable in magnitude as a function of the indicated direction of said second compass, means for combining said first and second quantities, and means operable by said combined quantities to produce a correct directional indication on any given heading.

2. In a self compensating system for indicating correct magnetic directions, the combination including two magnetic compasses spaced relative to each other so that the deviation in each for any given heading will be of the same sense but of a different order, separate means operatively connected to be controlled by each compass respectively for producing first and second quantities variable in magnitude with the indicated headings of said compasses, means operatively connected to be controlled by said separate means for continuously producing a third quantity variable in magnitude with the difference between said first and second quantities, means operatively connected to said last named means and said separate means producing said first quantity for combining said first and third quantities to adjust said first quantity as a function of said difference, and means responsive to said first quantity as adjusted to indicate the correct magnetic heading.

3. In a self compensating system for indicating correct magnetic directions, the combination including two magnetic compasses spaced relative to each other so that the deviation in each for any given heading will be of the same sense but of a different order, the deviations of a first one being equal to a fixed ratio of the difference in their deviations, separate means operably connected to be controlled by each compass respectively for producing first and second quantities variable in magnitude with the indicated headings of said compasses, means combining said quantities for producing a third quantity variable as the difference between said first and second quantities, means for combining said first quantity with a portion of said third quantity equal to said fixed ratio, and means responsive to last said combined quantities for indicating the correct magnetic heading.

4. In a self compensating system for indicating correct magnetic directions, the combination of two magnetic compasses spaced relative to each other so that the deviations produced in each by local magnetic material will be of the same sense but of a different order for varying headings of the vehicle upon which the said compasses are mounted, the deviations of the first being less than the deviation of the second and equal to a fixed determinable ratio of the difference in their deviations, separate means operable by the magnetic element of each compass for transmitting at a distance an electrical quantity having a magnitude equal to a function of the indicated direction of its respective compass, a repeating instrument operable by the electrical quantities having main and compensating coils, means connecting the main coil of the repeating instrument to the transmitting means associated with said first compass so that the repeating instrument would normally faithfully repeat the indicated direction of said compass, means for deriving a difference electrical quantity equal to the difference in magnitude of the electrical quantities transmitted by each of said means, and means for applying to said compensating coils a portion of said difference quantity equal to said fixed ratio, whereby the instrument will indicate the correct magnetic heading corresponding to said compass heading.

5. In a self compensating system for indicating correct magnetic directions including in combination two magnetic compasses spaced relative to each other so that the deviations produced in each by local magnetic material on varying headings of the vehicle upon which they are mounted will be different, separate means for obtaining electrical quantities for reproducing at a distance the directional indications of each compass, each means including impedance bridge circuits operatively associated with each compass, the electrical output of each impedance bridge circuit being variable in accordance with a function of said indicated direction, a repeating instrument operable by said electrical quantities when energized by the output of the bridge circuits associated with each compass for faithfully repeating its indicated directions, and means combining the electrical outputs of corresponding bridge circuits of each of said separate means to obtain a difference electrical quantity which when applied to said repeating instrument energized to repeat the indication of one of said compasses will compensate for its deviation to indicate correct magnetic directions corresponding to the directions indicated by said compass.

6. In a self compensating system for indicating correct magnetic directions, the combination including two magnetic compasses spaced relative to each other so that the deviations produced in each by local magnetic material will be of a different order but of the same sense, the deviation of one of said compasses being equal to a determinable fixed ratio of the difference in their deviations, separate means operably connected to be controlled by each compass respectively for obtaining an electrical quantity variable in magnitude in accordance with changes in the indicated direction of each of said compasses, means responsive to said quantities for obtaining a third electrical quantity having a magnitude proportional to the fixed ratio of the difference in said first two electrical quantities, and directional indicating means operable by the electrical quantity obtained from the means controlled by said first compass and said third electrical quantity for indicating the correct magnetic direction corresponding to the direction indicated by said first compass.

7. In a self compensating system for indicating correct magnetic directions, the combination including two magnetic compasses spaced relative to each other so that the deviation in each for any given heading will be of the same sense but of a different order, the deviations of a first one being equal to a fixed ratio of the difference in their deviations, means responsive to the directional indications of said first compass for producing electrical quantities variable in magnitude as a function of said indicated directions, means controlled jointly by said compasses for producing an electrical quantity which varies in magnitude as a function of the changes in the difference of said indicated headings of said first and second compasses, directional indicating means including an indicator element and having at least a main winding and at least a compensating winding adapted when energized to actuate said indicator element, means for energizing said main winding with the electrical quantity produced by said first named means, and means for energizing said compensating winding with a portion of the electrical quantity produced by said second means equal to said quantity multiplied by said fixed ratio.

8. A course maintaining device for vehicles comprising a first and second impedance bridge network, an electrical power supply source for energizing each of said bridge networks, said first impedance bridge network having an element movable by the earth's magnetic field to alter the impedance of the arms forming one branch of said bridge network, said second impedance bridge network having an element movable by the earth's magnetic field to adjust the impedance of the arms forming one branch thereof whereby the voltage appearing across the output diagonals of each bridge network will vary in magnitude and direction as a function of the position of their respective movable elements, means combining the respective output voltages of the said bridge networks to produce a difference voltage, means combining a portion of said difference voltage with the output voltage of one of said bridge networks to thereby compensate for the deviation in position of the movable element of last said bridge network produced by the distortions in the earth's magnetic field resulting from localized ferric metal, and direction indicator means responsive to last said combined voltages.

9. In a self compensating system for indicating correct relative directions, the combination including a pair of like direction indicating means each of which is subject to deviation, said indicating means being spaced relative to each other so that the deviation in each for any given direction will be of the same sense but of a different order, the deviation of one being equal to a fixed ratio of the difference in their deviations, separate means responsive respectively to the direction indicated by each indicating means for producing first and second quantities variable in magnitude as a function of the direction indicated by each said indicating means, means combining said first and second quantities for producing a third quantity variable as the difference between said first and second quantities, means for combining said first quantity with a portion of said third quantity equal to said fixed ratio, and means responsive to last said combined quantities for indicating the correct direction.

10. In a self-compensating system for indicating correct relative directions, the combination including a pair of like direction indicating means each of which is subject to deviation, said indicating means being spaced relative to each other so that the deviation in each for any given direction will be of the same sense but of a different order, the deviation of one being equal to a fixed ratio of the difference in their deviations, separate means responsive respectively to the direction indicated by each indicating means for producing first and second voltages variable in magnitude as a function of the direction indicated by each said indicating means, means combining said first and second voltages for producing a third voltage variable as the difference between said first and second voltages, means for combining said first voltage with a portion of said third voltage equal to said fixed ratio, and means responsive to last said combined voltages for indicating the correct direction.

WILFRID GORDON WHITE.